United States Patent
Obata et al.

[11] Patent Number: 5,825,906
[45] Date of Patent: Oct. 20, 1998

[54] SIGNATURE RECOGNITION SYSTEM

[75] Inventors: Kenzo Obata, Okazaki; Yoshiki Uchikawa, Nagoya; Takeshi Furuhashi, Nagoya; Xuhua Yang, Nagoya, all of Japan

[73] Assignee: Nippondenso Co., Ltd., Kariya, Japan

[21] Appl. No.: 807,980

[22] Filed: Mar. 3, 1997

Related U.S. Application Data

[63] Continuation of Ser. No. 455,908, May 31, 1995, abandoned.

[30] Foreign Application Priority Data

Nov. 30, 1994 [JP] Japan ................................ 6-296552

[51] Int. Cl.$^6$ .............................. G06K 9/00; G06G 7/00
[52] U.S. Cl. ...................... 382/119; 382/116; 382/159; 395/3
[58] Field of Search .................... 382/159, 187, 382/116, 119; 395/3, 13

[56] References Cited

U.S. PATENT DOCUMENTS

| | | | |
|---|---|---|---|
| 4,821,333 | 4/1989 | Gillies | 395/13 |
| 5,048,095 | 9/1991 | Bhanu et al. | 395/13 |
| 5,101,437 | 3/1992 | Plamondon | 382/122 |
| 5,159,667 | 10/1992 | Borrey et al. | 395/148 |
| 5,191,613 | 3/1993 | Graziano et al. | 380/25 |
| 5,222,192 | 6/1993 | Shaefer | 395/13 |
| 5,319,721 | 6/1994 | Chefalas et al. | 382/187 |
| 5,425,109 | 6/1995 | Saga et al. | 382/159 |
| 5,446,826 | 8/1995 | Otsuki | 395/3 |
| 5,446,827 | 8/1995 | Shigeoka et al. | 395/3 |

FOREIGN PATENT DOCUMENTS

| | | | |
|---|---|---|---|
| 5135206 | 6/1993 | Japan | 382/159 |
| 9300659 | 1/1993 | WIPO | 382/121 |

OTHER PUBLICATIONS

"A Method for finding knowledge of Signature Recognition Using Genetic Algorithm" by T. Furuhashi et al; Jun. 1, 1994; 10th Fuzzy System Symposium.

"A Basic Study on Off–Line Signature recognition Using a Fuzzy Net" by T. Furuhashi et al; Jul. , 1993; Electric Engineers Institute Report, vol. 113–C, No. 7.

"A Basic Study on Signature Recognition" by S. Watanabe et al; 8th Fuzzy System Symposium (May 26 –28, 1992).

*Primary Examiner*—Joseph Mancuso
*Assistant Examiner*—Jayanti K. Patel
*Attorney, Agent, or Firm*—Cushman Darby & Cushman IP Group of Pillsbury Madison & Sutro LLP

[57] ABSTRACT

A micro computer, constituting a signature recognition apparatus, comprises an automatic signature creating section, a data extracting section, a recognition network section, a retrieval section, and a memory section. The data extracting section creates personal data representing a plurality of personal characteristics or features based on an input signature. The recognition network section selects the data to be used for evaluation from the personal data representing personal characteristics or features, and executes an evaluation of thus chosen data. The retrieval section, using the genetic algorithm, finds out a combination pattern having preferable evaluation result. Accordingly, in recognizing signatures, it becomes possible to know beforehand what kind of personal characteristics or features data should be utilized for the recognition of the given signatures, thereby increasing the accuracy in the recognition.

25 Claims, 12 Drawing Sheets

FLOW OF GENETIC CALCULATIONS

FIG. 11
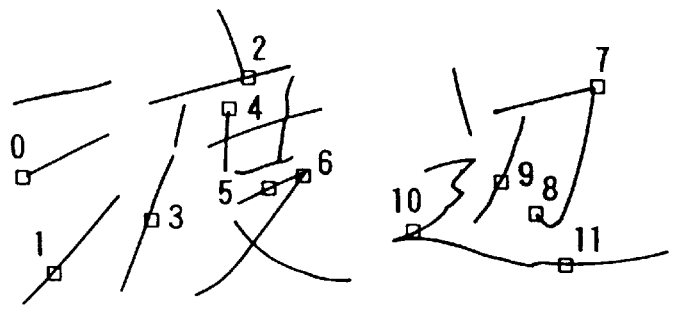
NO. 0 : (10, 7, 1, 0, 0, 0)
NO. 1 : (30, 10, 0, 0, 0, 1)
NO. 2 : (56, 6, 1, 0, 1, 0)
NO. 3 : (71, 7, 0, 1, 0, 0)
NO. 4 : (80, 12, 0, 0, 0, 1)
NO. 5 : (122, 9, 0, 0, 0, 1)
NO. 6 : (129, 9, 0, 1, 1, 0)
NO. 7 : (161, 9, 0, 1, 0, 0)
NO. 8 : (181, 6, 0, 0, 1, 0)
NO. 9 : (188, 4, 0, 1, 0, 0)
NO. 10 : (225, 12, 1, 0, 0, 1)
NO. 11 : (245, 11, 0, 1, 0, 1)
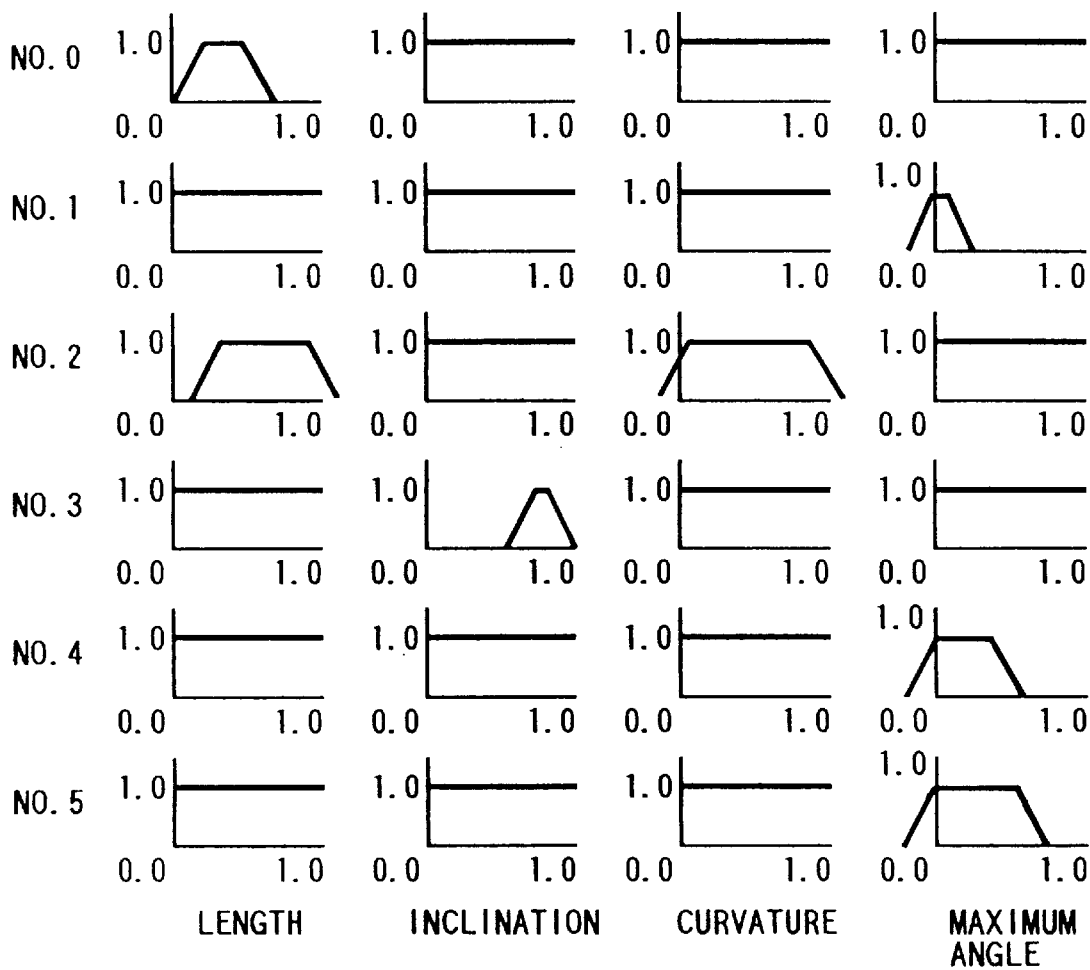
PERSONAL CHARACTERISTICS OF SIGNATURE

CHARACTERISTICS OF NEGATIVE EXAMPLE

EFFECT OF GENETIC OPERATION

SIGNATURE RECOGNITION SYSTEM

This is a continuation of application Ser. No. 08/455,908, filed on May 31, 1995, which was abandoned upon the filing hereof.

BACKGROUND OF THE INVENTION

1. Field of the Invention

This invention relates to a signature recognition system.

2. Related Art

The demand for a system capable of recognizing handwritten signatures has been recently increasing. In conventional systems, the recognition of handwritten signatures is classified into a category of pattern recognition subjected to fluctuations, which usually have difficulty realizing as a practical recognition system.

FIG. 14 shows one example of this kind of conventional signature recognition apparatus. The signature recognition apparatus disclosed in FIG. 14 is chiefly separated into a pre-processing section, which extracts personal characteristics or features of a signature based on handwritten signature data entered through an appropriate input device, and a recognition network, which executes learning and recognition with respect to the extracted results using a neural net or the like. The pre-processing section is further divided into two portions: an off-line signature recognition; and on-line signature recognition, in accordance with the type of input device.

In an off-line signature recognition system, an input device 101a is, for example, constituted by an image scanner. The input device 101a is connected to a pre-processing device 102a, which detects stroke densities based on output of the input device 101a. The pre-processing device 102a is connected to an input terminal of a recognition network 103, which has an output terminal connected to an output device 104. Details of such an off-line signature recognition system are disclosed and explained in "A Basic Study on Off-line Signature Recognition Using a Fuzzy Net" (Shigeru Watanabe, Takeshi Furuhashi, Yoshiki Uchikawa, and Kenzo Obata, Electric Engineers Institute Report, VOL. 113-C, NO. 7, July 1993).

On the other hand, in an on-line signature recognition system, an input device 101b is constituted by a digitizer or the like. The input device 101b is connected to a pre-processing device 102b, which detects spectra of signatures on the basis of output of the input device 101b. The pre-processing device 102b is connected to the recognition network 103 having the output terminal connected to the output device 104. Details of such an on-line signature recognition system are disclosed and explained in "A Basic Study on Signature Recognition Using a Fuzzy Net" (Shigeru Watanabe, Takeshi Furuhashi, and Yoshiki Uchikawa, 8th Fuzzy Symposium, p173–p176, May 26–28, 1992).

The above-described signature recognition systems, however, do not provide sufficient flexibility in the pre-processing device, which serves to enter data to the recognition network. That is, no consideration or preparation is given beforehand in determining how many and what kind of personal characteristics or features data are to be used for signature recognition taking account of differences of individual signers. Hence, even if trial and error is repeatedly and thoroughly performed, improvement in the recognition rate or the effectuality of the signature recognition support may not be obtained. More specifically, in the pre-processing stage, processing for taking care of personal characters or features peculiar to each of signers is not executed in the above-described detection of stroke densities of signature if an off-line signature recognition performed or in the detection of spectra densities based on P-type Fourier transform if an on-line signature recognition is performed. Furthermore, there is not found any idea of changing the extracting portions of the signature in accordance with the individuality of each signer.

SUMMARY OF THE INVENTION

Accordingly, in view of above-described problems encountered in the related art, a principal object of the present invention is to provide a signature recognition apparatus employing a mechanism for effectively extracting individual personal characteristics or features from given signature data taking account of differences of individual signers and creating personal data peculiar to each signer in the pre-processing stage prior to a decisive recognition stage, thereby increasing the accuracy of the signature recognition.

In order to accomplish this and other related objects, one aspect of the present invention provides a signature learning and recognition apparatus comprising: input means for inputting a handwritten signature and generating signals representing the handwritten signature; characteristic data generating means for sampling the signals generated by the input means at predetermined timings and generating characteristic data representing a plurality of characteristic portions of the handwritten signature and having fluctuations on the basis of the data sampled; a plurality of independent fluctuation absorbing means for receiving characteristic data representing each of characteristic portions and creating fuzzified data using membership functions; a plurality of independent switching means, associated with the plurality of independent fluctuation absorbing means, each switching means passing or blocking fuzzified data in accordance with a predetermined control rule; evaluating means for inputting data passing through the plurality of independent switching means and comparing the input data with an ideal value, thereby obtaining an evaluation value of the control rule presently used; and retrieval means for finding an optimum control rule having a best evaluation value by repeating a predetermined operation. The predetermined operation of the retrieval means comprises steps of renewing part of the presently used control rule by a given rate, making each of the plurality of independent switching means pass or block the fuzzified data in accordance with a renewed control rule, and obtaining an evaluation value of the renewed control rule by the evaluating means. The obtained optimum control rule is stored in an appropriate memory and is used later for judging whether the signature in question is genuine or false on the basis of this optimum control rule.

In the above signature recognition apparatus, it is preferable that the retrieval means deletes some of the control rules having lower evaluation values by the given rate, selects a plurality of control rules having higher evaluation values, creates new control rules by combining the control rules selected, and supplements the deleted control rules by the newly created control rules.

Furthermore, it is preferable that the control rule is represented by information comprising a plurality of binary-encoded data, and the retrieval means reverses some of the binary-encoded data at a given rate.

Yet further, it is preferable that the evaluating means comprises a multiplication unit for multiplying data passing through the plurality of independent switching means; and an evaluation function for calculating the evaluation value on the basis of a resultant data generated from the multiplication unit and an ideal value.

According to the present invention, a group of independent switching means pass or block the fuzzified data in accordance with the presently used control rule. The evaluating means compares the data passing through the switching means with the ideal value to obtain an evaluation value of the presently used control rule. The retrieval means renews part of the control rule by a given rate. By repeating this retrieval operation until the number of control rules becomes comparable with several tens of signatures, then, from among the thus created numerous control rules, the retrieval means finds the optimum control rule having a best evaluation value. Thus, it becomes feasible to know beforehand what kind of personal characteristic data should be utilized for the recognition of signatures, thereby increasing the accuracy in the recognition.

Furthermore, the retrieval means some of low-evaluation control rules at the given rate. Then, a plurality of high-evaluation control rules are selected in order to create new control rules by combining thus selected control rules randomly. Then, the deleted control rules are supplemented by these newly created control rules.

Namely, the above-described operation corresponds to the breeding of elite control rules, i.e. so-called selection and crossover in the genetic algorithm. Thus, the present invention obtains an evaluation value having a best control rule, thus providing a signature recognition system promising excellent recognition rates.

Moreover, the evaluating means comprises the multiplication unit which multiplies all of data passing through the plural independent switching means. Such a multiplication unit brings better efficiency in the signature recognition.

Furthermore, a second aspect of the present invention provides a signature characteristic learning method comprising steps of: inputting a handwritten signature; transforming the handwritten signature into sequential dot data; generating characteristic data representing a plurality of characteristic portions of the handwritten signature having fluctuations that are based on the sequential dot data; creating fuzzified data through a plurality of independent membership functions on the basis of the characteristic data representing each of the characteristic portions; passing or blocking the fuzzified data created by the plural membership functions in accordance with a given control rule; comparing passed fuzzified data with an ideal value for obtaining an evaluation value of the control rule presently used; and finding an optimum control rule having a best evaluation value by repeating a series of operations, the operations including steps of renewing part of the presently used control rule by a given rate, passing or blocking the fuzzified data in accordance with a renewed control rule, and obtaining an evaluation value of the renewed control rule, thereby obtaining personal characteristic data peculiar to each signer.

It is preferable that the optimum control rule is stored in connection with an identification number of the signer. The characteristic data includes a plurality of parameters representing a line segment on the handwritten signature. Furthermore, it is preferable that each output of the independent membership function is selectively passed or blocked by an associated switching means. Thus, the control rule defines an ON-and-OFF pattern of plural switch means associated with the independent membership functions.

More specifically, the renewing operation of the presently used control rule is executed by deleting some of control rules having low fitnesses according to the selection of a genetic algorithm. The deleted control rules are supplemented by newly created control rules. The newly created control rules are produced by crossing a plurality of control rules having high fitnesses.

Moreover, a third aspect of the present invention provides a signature characteristic recognizing method comprising steps of: requesting a user to enter an identification number; inputting an unknow signature; fetching a predetermined control rule peculiar to a genuine signature corresponding to the unknow signature from a memory in accordance with the identification number entered;

extracting characteristic data representing a plurality of characteristic portions of the unknow signature; and evaluating the characteristic data by checking whether the characteristic data agree with the fetched control rule, thereby judging the inquired signature is genuine or false.

BRIEF DESCRIPTION OF THE DRAWINGS

The above and other objects, features and advantages of the present invention will become more apparent from the following detailed description which is to be read in conjunction with the accompanying drawings, in which:

FIG. 11 is a view showing one example (positive example) of signature data having chromosomes determined;

DETAILED DESCRIPTION OF THE PREFERRED EMBODIMENT

A preferred embodiment of the present invention will be explained in greater detail hereinafter with reference to the accompanying drawings.

Figure 1:
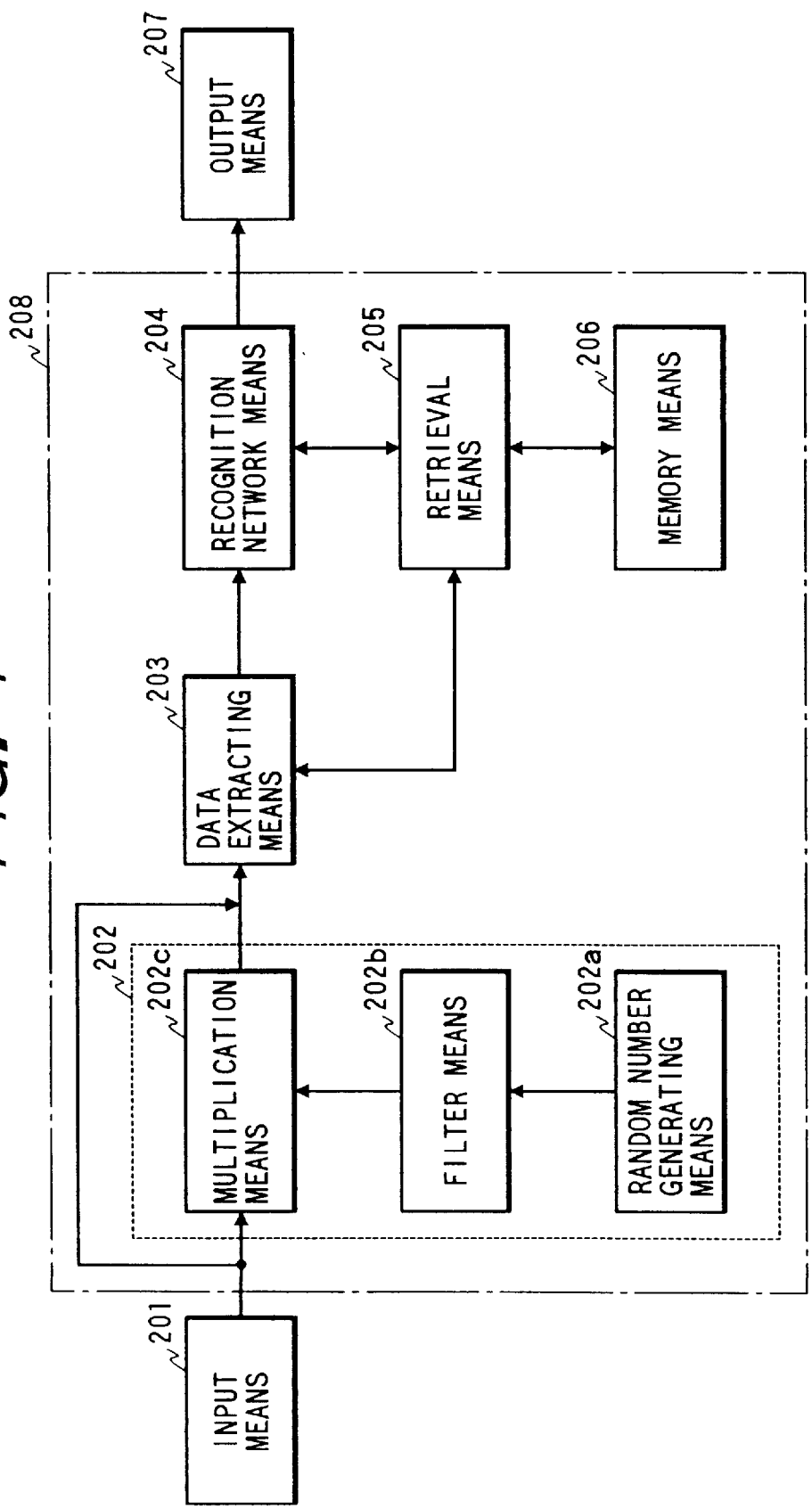
FIG. 1 is a schematic block diagram showing one embodiment of a signature recognition system in accordance with the present invention.

This embodiment is based on the on-line signature recognition system. FIG. 1 is a schematic block diagram showing one embodiment of a signature recognition system in accordance with the present invention.

In FIG. 1, the signature recognition system chiefly consists of an input means 201 (such as a tablet, a digitizer and the like) for inputting signatures handwritten by users or signers and outputting data of sequential dots arranged on a two-dimensional surface, a micro computer 208 for executing predetermined calculations on the basis of the sequential dot data entered from the input means 201, and an output means 207 for receiving resultant data from the micro computer 208 and sending the same to an external device (not shown). The micro computer 208, when expressed as a group of several functional blocks as shown in a block diagram of FIG. 1, comprises an automatic signature creating means 202, a data extracting means 203, a recognition network means 204, a retrieval means 205, and a memory means 206.

More specifically, the automatic signature creating means 202 consists of a random number generating means 202a for generating random numbers, a filter means 202b for limiting the width of a fluctuation generated from the random number generating means 202a, and a multiplication means 202c for multiplying the sequential dot data supplied from the input means 201 and the random numbers generated from the filter means 202b. With such an arrangement, the automatic signature creating means 202 can flexibly create data of sequential dots by varying the width of the filter means 202b. For example, when the variation of an output is suppressed within 5% of its input in the multiplication means 202c, automatically created from the multiplication means 202c are sequential dot data of positive example (i.e. genuine signature). Meanwhile, when the output is allowed to vary within a region 20% to 50% of its input in the multiplication means 202c, automatically created from the multiplication means 202c are sequential dot data of negative example (i.e. false signature). The random numbers of more than 50% are not used for any purposes since apparently different data are created from them.

The data extracting means 203 receives the sequential dot data including positive and negative examples created as described above, which are in turn normalized with respect to time so as to produce data of, for example, a total of 256 sequential dots. Then, an arbitrarily selected line segment is extracted from these normalized data of sequential dots. Based on this line segment, for example four kinds of data which may consist of a length (Li), an inclination (Si), a maximum angle (θi) and a curvature (Ci) can be obtained through predetermined calculations. The method of normalization and data extraction in the data extracting means 203 will be explained in more detail later.

Figure 2:
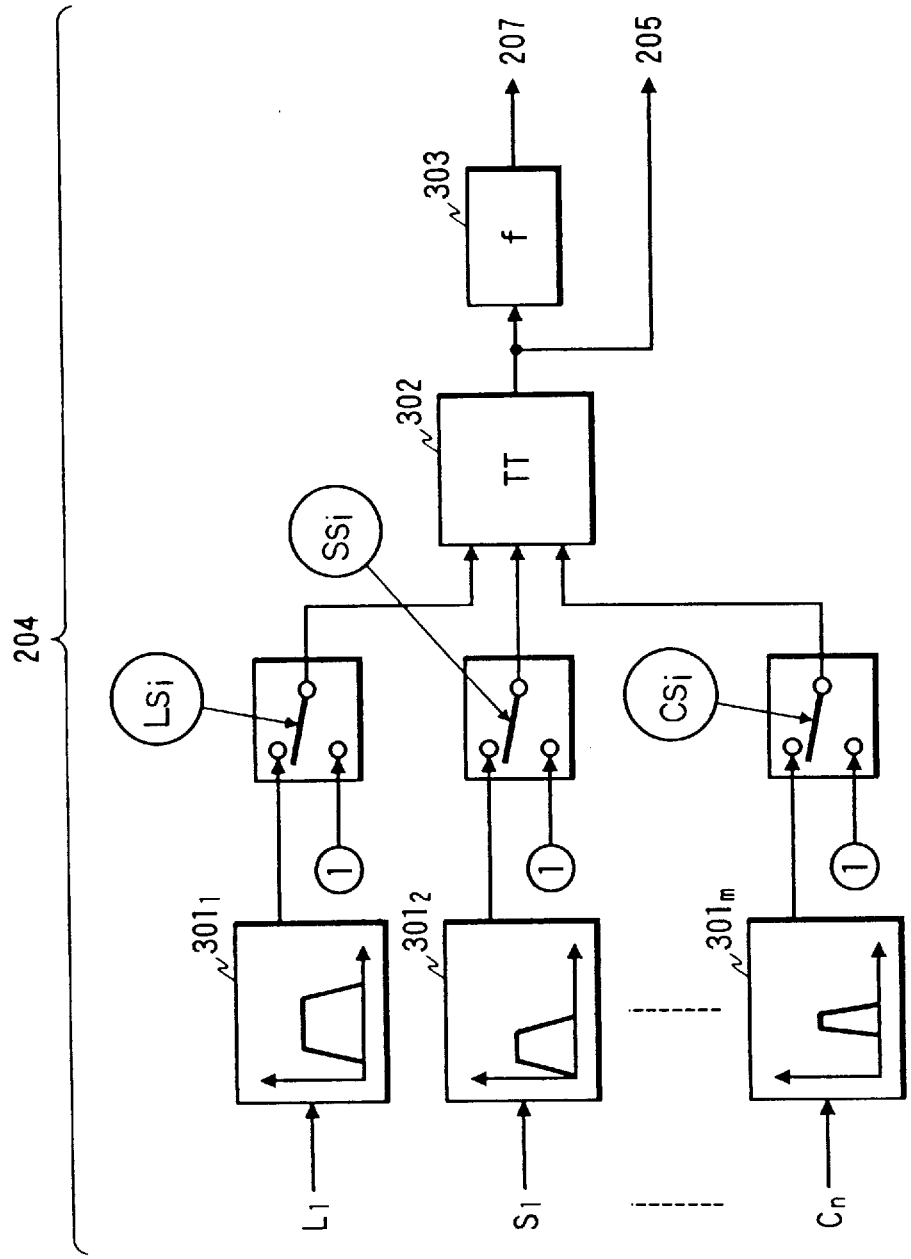
FIG. 2 is a circuit arrangement showing details of a recognition network of the signature recognition system disclosed in FIG. 1.

Next, the recognition network means 204, as shown in FIG. 2, comprises a plurality of input sections of independent trapezoidal membership functions 3011 . . . 301n, where n=1,2,----,m (although m=4 in this present embodiment), a plurality of independent switches $L_{si}$, $S_{si}$, $\theta_{si}$ and $C_{si}$, a single multiplication unit 302, and an output section of an evaluation function 303. (Switch $\theta_{si}$ is omitted from FIG. 1). The membership function 3011 . . . 301n absorb fluctuations of four kinds of data output from the data extracting means 203, and sends them to the switches $L_{si}$, $S_{si}$, $\theta_{si}$ and $C_{si}$. The switches $L_{si}$, $S_{si}$, $\theta_{si}$ and $C_{si}$ cooperatively select the data to be entered into the multiplication unit 302. The multiplication unit 302 multiplies all of data entered through respective switches $L_{si}$, $S_{si}$, $\theta_{si}$ and $C_{si}$, and sends a resultant value to the evaluation function 303. The evaluation function 303 performs calculations based on predetermined arithmetic formulas and evaluates the resultant arithmetic data, thereby determining whether or not the resultant data should be output. The use of membership functions, selection of switches, and evaluation based on the evaluation function will be explained in more detail later.

The retrieval means 205 retrieves an optimum chromosome having a best evaluation value on the basis of the evaluation result of the recognition network means 204, using the genetic algorithm. More specifically, for the retrieval operation in the retrieval means 205, an ON-and-OFF pattern representing the state of respective switches ($L_{si}$, $S_{si}$, $\theta_{si}$ and $C_{si}$) and an information ($N_{pi}$) representing the number of the sequential dot data corresponding to the above pattern are specified as one locus. A plurality of combinations of ON-and-OFF patterns representing the state of respective switches ($L_{si}$, $S_{si}$, $\theta_{si}$ and $C_{si}$) corresponding to several extracting positions of one signature and related information ($N_{pi}$) representing the number of the corresponding sequential dot data are specified as a chromosome. In short, the retrieval means 205 identifies or finds out the best ON-and-OFF pattern of the switches ($L_{si}$, $S_{si}$, $\theta_{si}$ and $C_{si}$) corresponding to each extracting position on the basis of the evaluation result of the recognition network means 204. This determination, for example, decides which of four kinds of data (i.e. length Li, inclination Si, maximum angle θi and curvature Ci) should be used for recognizing each line segment. The genetic algorithm used in the retrieval means 205 will be explained in more detail later.

Next, operation of the above-described signature recognition system will be explained below.

The operation of the signature recognition system is chiefly separated into two tasks, one being a learning mode for registering signatures and the other being a recognition mode for checking whether an unknown signature is identical with the registered signature (i.e. whether the unknown signature is genuine or false).

Learning Mode

Figure 3:
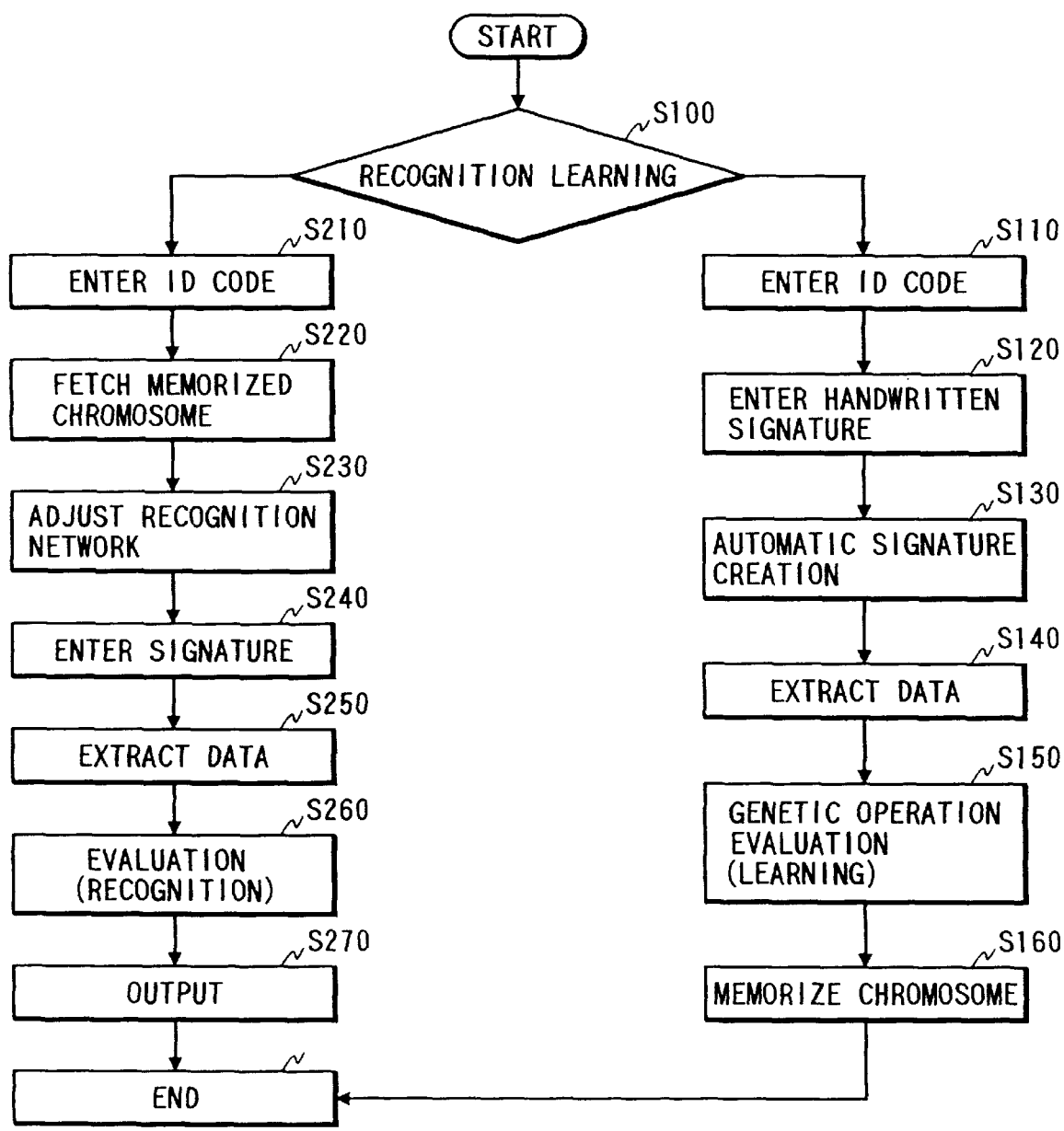
FIG. 3 is a flow chart showing operations executed in the signature recognition system in accordance with the present invention.

First of all, an overall operation of the learning mode will be explained with reference to the flow chart shown in FIG. 3. This flow chart shows the processing executed by the micro computer (i.e. CPU) 208 shown in FIG. 1.

In a step 100, the CPU detects whether any mode is selected by a user. That is, a user having a signature or signatures to be registered or checked may select either the learning mode or the recognition mode, using an input device (not shown) such as a keyboard connected to a main terminal of the system. Based on this selection the CPU 208 proceeds to a step 110 when the recognition mode is selected or to a step 210 when the learning mode is selected.

In the step 110, the user is requested to enter an ID (identification) code. For example, if this signature recognition system is an interactive computing system, a monitor (i.e. display unit) will be usually used to send such a request message to the user. Referring to the ID code of the user thus entered, an ID code is set for a handwritten signature to be entered subsequently.

In a step 120, the user or signer is requested to enter a handwritten signature. In response to this request, the user or signer writes his/her signature by means of the input means 201 (i.e. tablet, digitizer or the like). Thus, the input means 201 generates sequential dot data representing the currently entered signature on a two-dimensional plane, which are shortly input into the automatic signature creating means 202.

In a step 130, the automatic signature creating means 202 (more specifically, the multiplication means 202c) multiplies the sequential dot data generated from the input means 201 with random number data supplied from the random number generating means 202a via the filter means 202b, thereby automatically creating a plurality of sequential dot data of positive example (genuine signature) and negative example (false signature) based on the sequential dot data representing a signature written by the user or signer.

In a step 140, the data extracting means 203 normalizes the sequential dot data sent from the automatic signature creating means 202 and extracts a line segment arbitrarily from the normalized sequential dot data. In this embodiment, the data extracting means 203 calculates and generates the above-described four kinds of data, length Li, inclination Si, maximum angle θi and curvature Ci. Details of this step 140 will be explained in more detail later.

In a step 150, the recognition network means 204 performs an evaluation of the thus obtained four kinds of data, length Li, inclination Si, maximum angle θi and curvature Ci. The retrieval means 205, based on the result of such an evaluation, determines an ON-and-OFF pattern representing the state of respective switches $L_{si}$, $S_{si}$, $\theta_{si}$ and $C_{si}$ and membership functions 301n (n=1,2---m). Then, using the genetic algorithm, the ON-and-OFF pattern of respective switches is optimized. The processing of the step 150 will be explained in more detail later.

In a step 160, the memory means 206 stores the optimum ON-and-OFF pattern of respective switches $L_{si}$, $S_{si}$, $\theta_{si}$ and $C_{si}$ and the information ($N_{pi}$) representing the number of the corresponding sequential dot data in connection with the related ID code.

Figure 4:
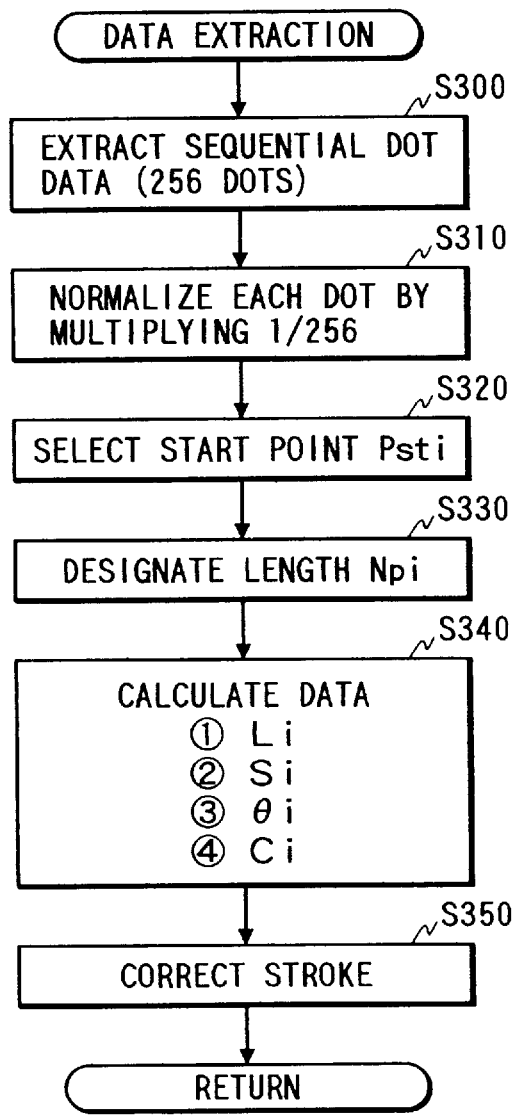
FIG. 4 is a flow chart showing details of the data extraction processing disclosed in the flow chart of FIG. 3.

Details of the step 140 will be next explained with reference to the flow chart of FIG. 4, which corresponds to the processing executed by the data extracting means 203 in the micro computer 208.

In a step 300, the data extracting means 203 receives the sequential dot data produced from the automatic signature creating means 202. In this case, the sequential dot data comprises two kinds of data positive examples (genuine signatures) and negative examples (false signatures). Therefore, for the purpose of management, the sequential dot data are discriminated by putting appropriate flags on the data.

In a step 310, the sequential dot data fetched in the step 300 are normalized with respect to time into, for example, a total of 256 sequential dot data. Such a normalization assures that the predetermined number (256) of sequential dot data are always obtained irrespective of writing speed of signature. In general, the number of data obtainable from one signature is possibly varied with a change of the writing speed. For example, a signature quickly written within a short time may get a total of 200 dot data, while the same signature if written slowly may acquire up to a total of 300 dot data. Thus, to eliminate this kind of drawback, the present invention employs a normalization for obtaining the same number of dot data in each signature. More specifically, when the number of obtainable data exceeds a predetermined number, some of the data are thinned out. On the contrary, when the number of the data obtainable is smaller than a predetermined number, new data will be added by interpolating the obtained data. Thus, the predetermined number of data are always obtained. In this case, interpolation is prohibited in a specific duration corresponding to an interval between two strokes separated with each other. For this end, it is assumed that a time interval from an end of the preceding stroke to a beginning of the succeeding stroke is substantially zero.

Figure 5:
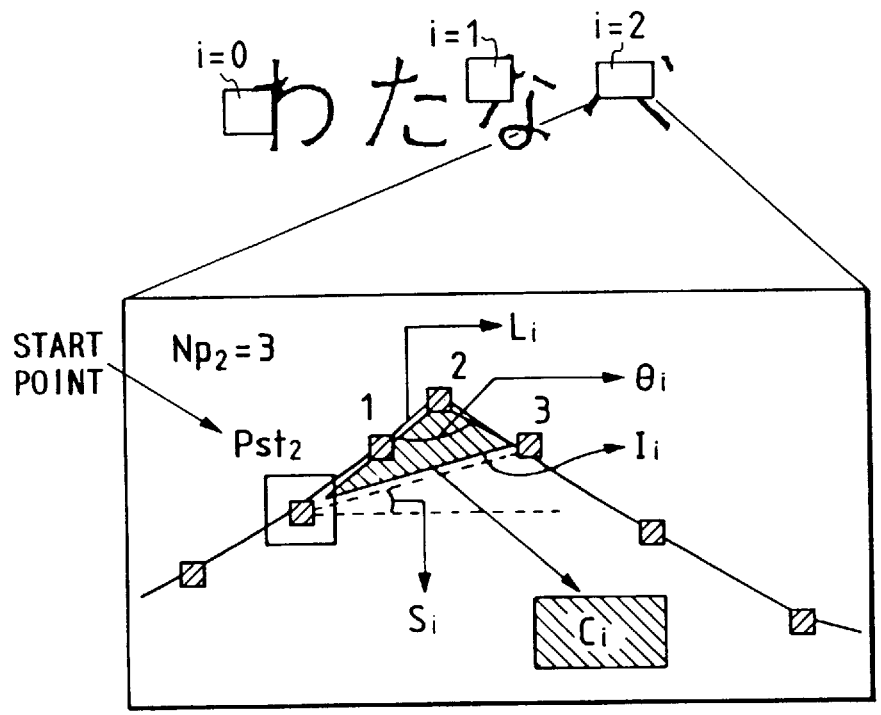
FIG. 5 is a view illustrating line segment data handled in the embodiment of the present invention.

In a step 320, as shown in FIG. 5, a start point $P_{sti}$ is arbitrarily selected among the normalized sequential dot data. Thereafter, in a step 330, a line segment having an arbitrary length (sequential-dot-data number $N_{pi}$ and an end point $P_{edi}$, i=1,2,----,n) is set. Namely, the start point $P_{sti}$ and the end point $P_{edi}$ of a line segment are selected at random. FIG. 5 shows four cursive kana characters, wa-ta-na-be, representing a Japanese name "Watanabe", and partly enlarges the last kana character "be", wherein a start point $P_{st2}$ is placed near the highest point (i.e. an apex) representing the kana character "be" and three sequential dots following the start point $P_{st2}$ are selected so as to encompass the apex. In other words, the above-selected sequential four dots defines or specifies the designated line segment.

In a step 340, on the basis of the line segment thus designated in the steps 320 and 330, calculations are done for obtaining the four kinds of data, i.e. length Li, inclination Si, maximum angle θi, and curvature Ci. On the four data obtained, the line Li is proportional to the instantaneous handwriting speed of the signature, since the sequential dot data are normalized with respect to time. Furthermore, when an average value of the length between adjacent two dot data is $L_{dot}$, it is required to equalize $N_{pi} \times L_{dot}$ to 0.5. Namely, the following equation is established.

$$Li = L_{ai} \times 0.5/(N_{pi} \times L_{dot}) \tag{1}$$

where $L_{ai}$ represents an actual length.

With the definition of the above equation 1, it becomes feasible to absorb an overall change of the handwriting speed. Although the present embodiment multiplies 0.5 in the right side of the equation 1, this value should be selected from adequate values in accordance with requirements in the display of the membership function later described.

The inclination Si is an angle between a straight line li and a horizontal line, the straight line li directly connecting the start point $P_{sti}$ and the end point $P_{edi}$. The maximum angle θi is the sharpest knuckle in the designated line segment. The curvature Ci represents an area enclosed by lines sequentially connecting the designated dot data, as hatched in FIG. 5. This area is normalized with respect to an isosceles right triangle having a base of straight line li.

Figure 6:
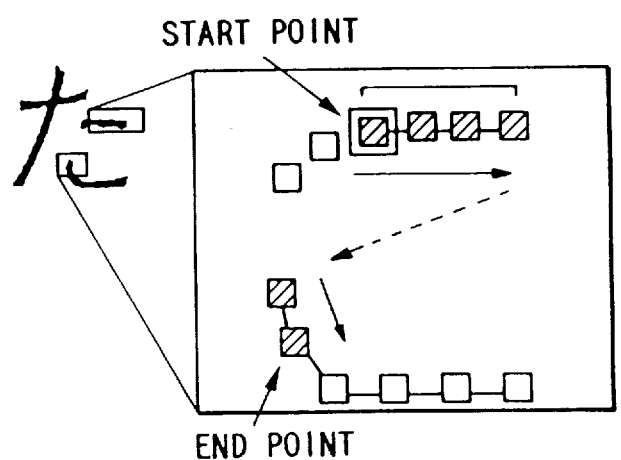
FIG. 6 is a view illustrating particular line segment data separated into two parts.

In a step 350, a stroke correction is performed in the event the start point $P_{sti}$ and the end point $P_{edi}$ are not located on the same stroke as shown in FIG. 6. That is, the line segment may comprise two, long and short, separate strokes. In such a case, the dot data on the longer one are used as sampling data. The length Li, in this case, is a sum of the lengths of separate line segments.

Figure 7:
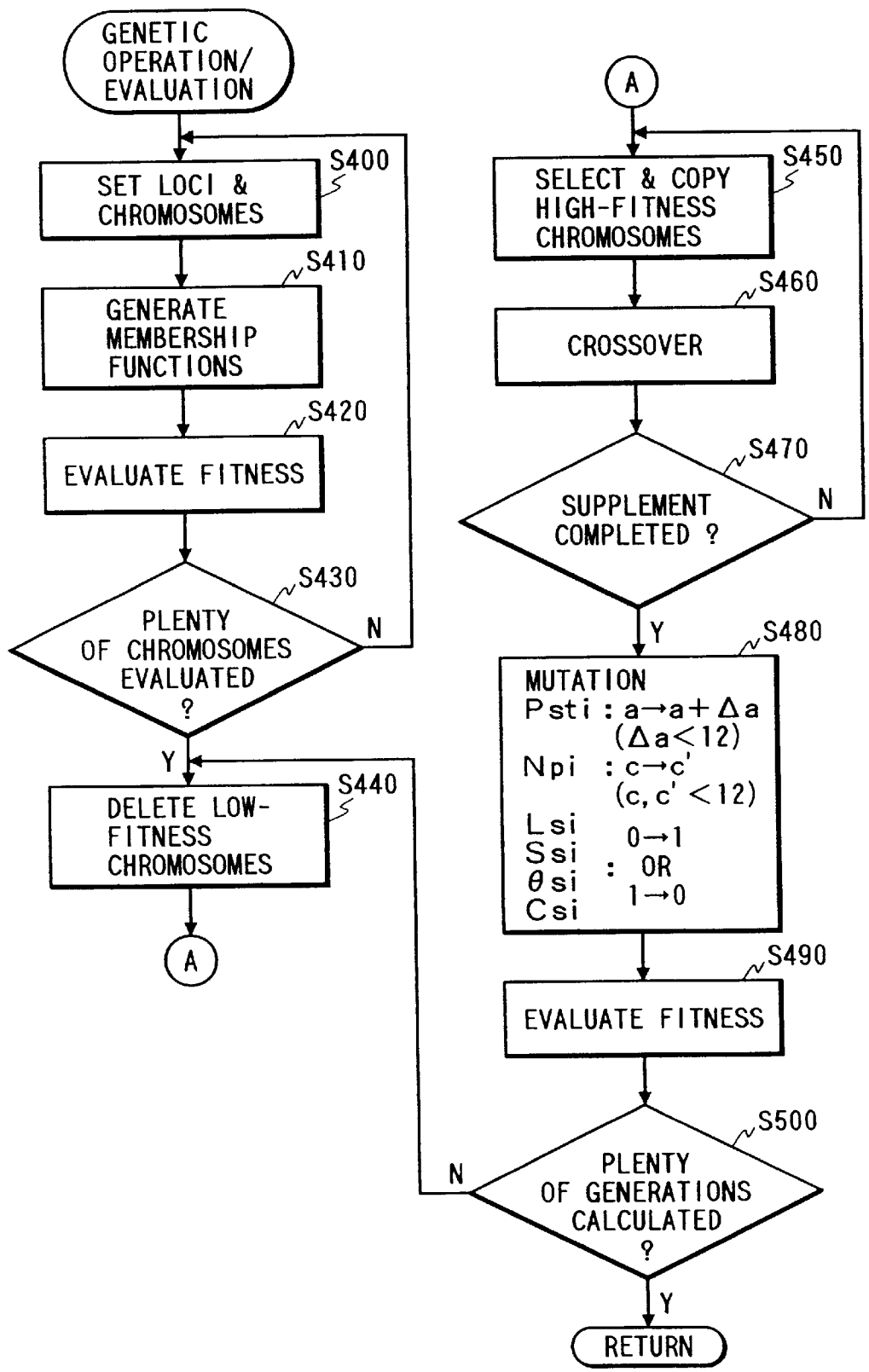
FIG. 7 is a flow chart explaining details of the genetic operation & evaluation processing disclosed in the flow chart of FIG. 3.
Figure 8:
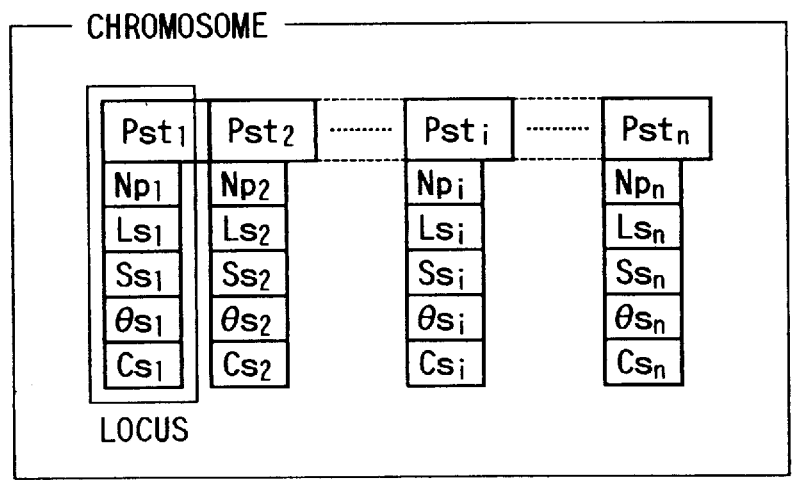
FIG. 8 is a view showing a typical chromosome arrangement.

Next, detailed operation of the step 150 will be explained with reference to the flow chart shown in FIG. 7, which corresponds to the processing executed by the recognition network means 204 and the retrieval means 205 in the micro computer 208.

In a step 400, a locus is set. More specifically, the four kinds of data extracted in the step 140 are regarded as locus, and each of the four kinds of data is regarded as a gene included in the locus. The locus is provided as information used in the determination of which of these genes should be evaluated or not. In other words, the locus is the information comprises an ON-and-OFF pattern of the switches $L_{si}$, $S_{si}$, $\theta_{si}$ and $C_{si}$. The locus further includes a sequential-dot-data number $N_{pi}$ representing the total number of sequential dots from the start point $P_{sti}$ and the end point $P_{edi}$. The locus having been set in this manner represents the information representing one line segment extracted in the step 140. Thus, a plurality of loci are successively set for covering one entire signature, thereby finally forming a single chromosome. Namely, one chromosome comprises the information relating to combinations of ON-and-OFF patterns representing the state of respective switches $L_{si}$, $S_{si}$, $\theta_{si}$ and $C_{si}$ corresponding to n line segments extracted from one signature, and the information relating to the extracting points of these n line segments.

For example, if a chromosome is defined by an expression of (10, (5,1,0,0,1), 25, (10, 0, 1, 1, 1),----) it should be interpreted as follows. A first given line segment is selected so as to start from 10th dot with a length equivalent to 5 dots. Of the four data of this first line segment, two of the length and curvature are used for the evaluation. Then, a line segment starting from 25th dot and having a length equivalent to 10 dots is selected as a second line segment. Of the four data of this second line segment, three of the inclination, maximum angle and curvature are used for the evaluation.

Figure 9:
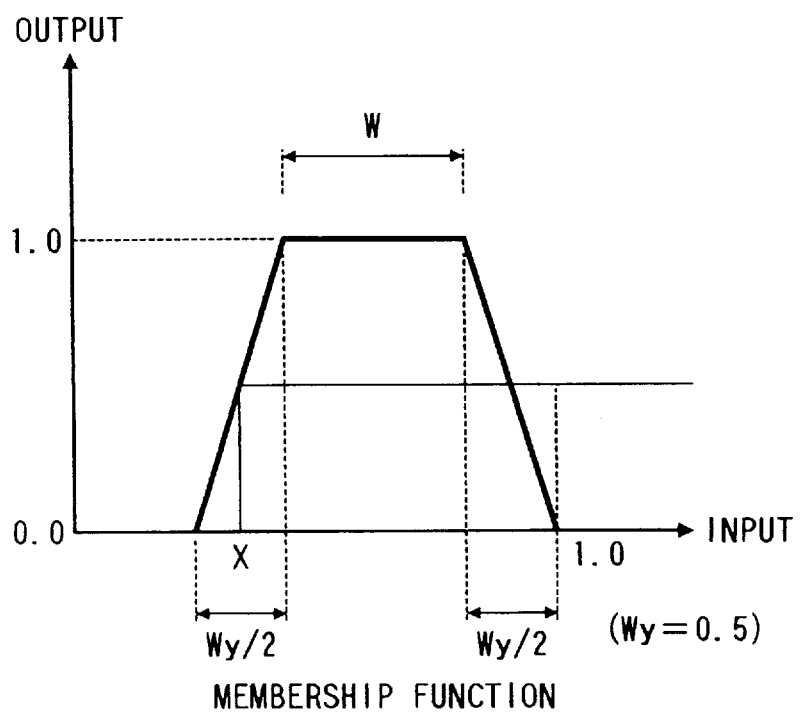
FIG. 9 is a graph showing a membership function.

In a step 410, the trapezoidal membership functions 301$n$ (n=1,2,---m) are set as input sections of the recognition network means 204. In the settings of the trapezoidal membership functions 301$n$, arbitrarily chosen three signature data (i.e. positive examples) serve as fundamental signatures. A width between a maximum value and a minimum value of each data obtainable from them is set to W, while a base is set to W+Wy (Wy=0.5 in this embodiment), as shown in FIG. 9. The purpose of providing such a membership function is to set a low-sensitivity portion in the output relative to its input, in order to absorb fluctuations of a signature. Because, even if the signer is the same person, his/her signature is not always identical and is slightly changed every time. Hence, there is a necessity of absorbing such fluctuations of signature. That is, if an input value does not exist somewhere in the region W, its output value is fairly reduced. When the input value if too far away from the region W, the output value becomes zero. Such a trapezoidal membership function 301$n$ is independently provided for each locus as shown in FIG. 11.

In a step 420, the grade value of each of the membership functions 301$n$ (n=1,2,---m) is multiplied with the data extracted from the data extracting means 203. A resultant value is then entered into the multiplication unit 302 through a switch associated with each membership function 301$n$. The multiplication unit 302 multiplies all of outputs given from respective membership functions 301$n$. The resultant value is generated as data representing one line segment. In this manner, multiplication data are successively obtained for all of the line segments covering one entire signature. Thereafter, the evaluation function 303 evaluates the data generated from the multiplication unit 302.

The switches $L_{si}$, $S_{si}$, $\theta_{si}$ and $C_{si}$ interposed between respective membership functions 301$n$ (n=1,2---m) and the multiplication unit 302 cooperatively provide an arrangement corresponding to the ON-and-OFF pattern in accordance with the information of the chromosome to be set in the step 400. The evaluation function 303 evaluates the fitness of chromosome; namely, the ON-and-OFF pattern of the switches is evaluated.

An evaluation function evaluating the fitness of chromosome is defined by the following equation (2).

$$\text{fitness} = \frac{1}{2}\left(\frac{\sum_{i=1}^{m1}|ti-oi|}{m1} + \frac{\sum_{i=1}^{m2}|ti-oi|}{m2}\right) \quad (2)$$

where ti represents a right output value of the recognition network, oi represents an actual output value, m1 represents the number of positive examples used for the evaluation, and m2 represents the number of negative examples used for the evaluation. For positive examples, the right output ti becomes 1, while for negative examples, the right output ti becomes 0.

In the evaluation of the above-defined chromosome's fitness, an output value not smaller than 0.8 is considered as positive example, while an output value not larger than 0.4 is considered as negative example. An output in a range of 0.4 to 0.8 is considered as undiscriminatable and is not used for any evaluations.

In the step 430, the retrieval means 205 makes a judgement as to whether a predetermined number of chromosomes have been already evaluated their fitnesses. If the judgement result of the step 430 is NO, the procedure of steps 400, 410, 420 and 430 are repeatedly executed until a YES answer is obtained. In other words, the procedure of steps 400–430 performs the breeding in the sense of the genetic algorithm. In this embodiment, the number of prepared chromosomes is, for example, 50.

In a step 440, some of chromosomes having low fitness are deleted from the group of predetermined number of chromosomes by a given rate of Pc % (e.g. 20%). In other words, the chromosomes having acceptable evaluation values in the ON-and-OFF pattern of the switches $L_{si}$, $S_{si}$, $\theta_{si}$ and $C_{si}$ are reserved, while the chromosomes having unsatisfactory evaluation values are removed. This procedure corresponds to a selection in the procedure of the genetic algorithm.

Figure 10:
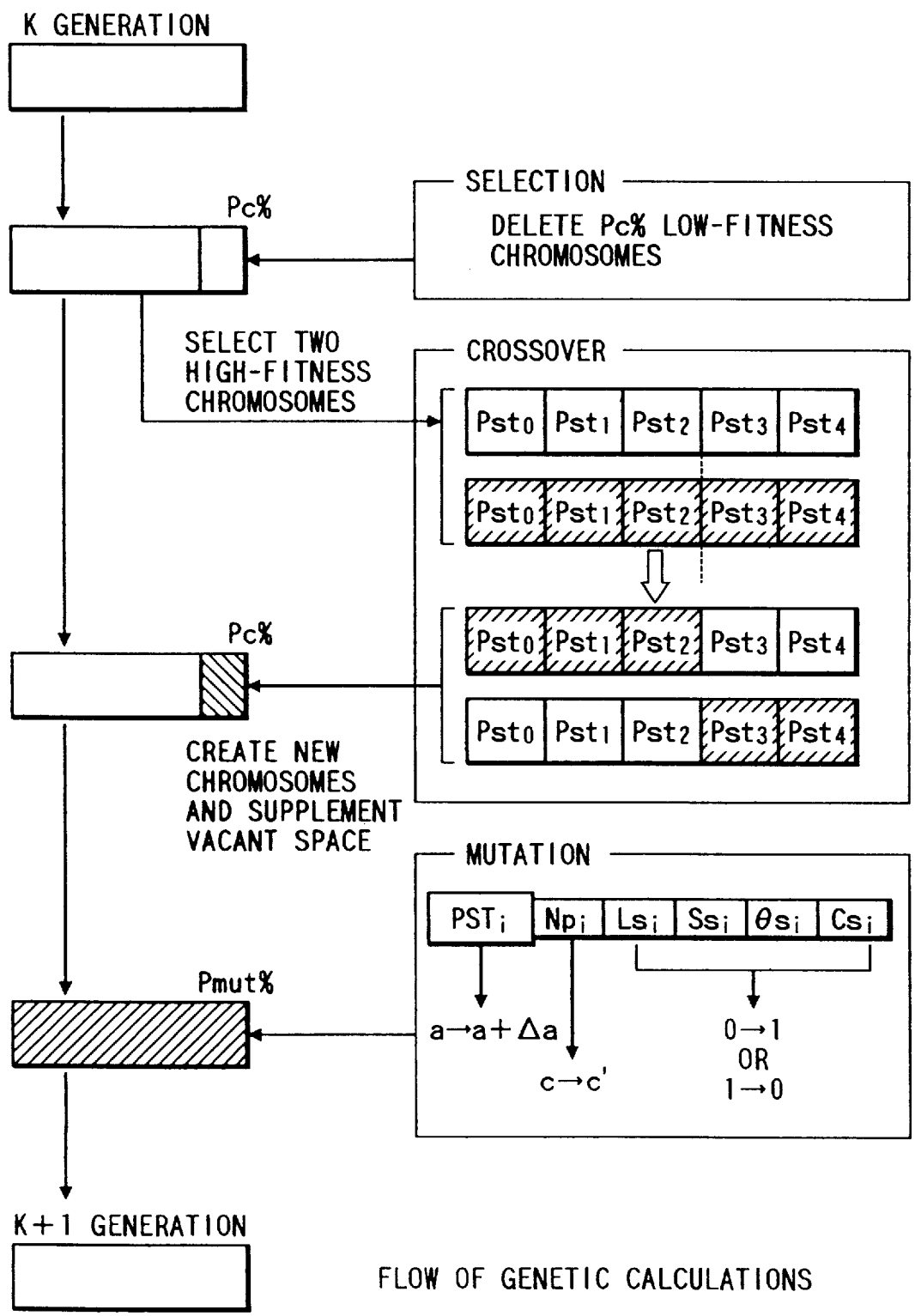
FIG. 10 is a view illustrating a genetic algorithm utilized in the embodiment of the present invention.

In a step 450, two chromosomes having higher fitnesses are chosen from the above predetermined number of chromosomes and are then copied. In a step 460, as shown in FIG. 10, the copied two chromosomes are crossed with each other so that some of corresponding loci are exchanged. Namely, between the selected two combinations each representing ON-and-OFF pattern of the switches $L_{si}$, $S_{si}$, $\theta_{si}$ and $C_{si}$, information corresponding to line segments located at the same position can be randomly exchanged each other, thereby newly creating two combinations of ON-and-OFF pattern information. In such a crossover, the loci to be exchanged are arbitrarily selected.

In a step 470, the space of Pc % chromosomes deleted in the step 440 is partly supplemented by the above two chromosomes newly created in the step 460. A series of procedures defined by the steps 450, 460 and 470, i.e. copy, crossover and supplement, is repeated until the vacancy of the deleted Pc % space is fully supplemented. In this supplement operation, the chromosome, if it is once used for the crossover, is prohibited to be selected again as a candidate for the crossover in the same generation. For this purpose, each chromosome is managed by putting a flag.

In a step 480, an operation giving mutation to the information of loci is executed. Except for elite chromosomes, almost all of the chromosomes are randomly subjected to this operation, with Pmu % (e.g. 10%) probability of actually causing mutation. In this case, to limit a variable width of the start point $P_{sti}$ of an extracting point, it is assumed that the mutation causes a change of a→a+Δa. Regarding the sequential-dot-data number $N_{pi}$, when its integer is c, the mutation causes a change of c→c' with provision of appropriate upper limits. This embodiment specifies Δamax=12 and cmax=12 as such upper limits, where Δamax represents the maximum variable width of the start point $P_{sti}$ while cmax represents the maximum value of the sequential-dot-data number. Thus, integers in this region are uniformly selected according to appropriate random numbers. In each of switches $L_{si}$, $S_{si}$, $\theta_{si}$ and $C_{si}$, the ON-and-OFF pattern is randomly changed.

In a step 490, the fitness of the chromosome is evaluated by the evaluation function 303 in the same manner as in the step 420. Namely, the chromosome, after it has been subjected to the mutation, is evaluated. The chromosome in this case represents loci data being set through a series of operations including selection, crossover and mutation.

In a step 500, it is judged whether a series of procedures specified by the steps 440 through 490 is repeated predetermined times (e.g. 300 times). If the judgement result of the step 500 is NO, these steps 440 through 490 are repeated continuously until a YES answer is obtained. In other words, the step 500 assures that the calculations have been done to cover a total of 300 generations in the genetic algorithm.

It becomes, after all, feasible to obtain chromosomes having higher fitnesses, each including information representing ON-and-OFF pattern of respective switches $L_{si}$, $S_{si}$, $\theta_{si}$ and $C_{si}$ and the extracting positions of corresponding sequential dot data. FIG. 11 shows a representative example. Numerals put on the signature correspond to the information representing loci. For example, the line segment designated by numeral 1 is characterized in that the curvature is very small. Namely, this drawing makes us understand the portions or data to be preferably used for the signature recognition.

Figure 13:
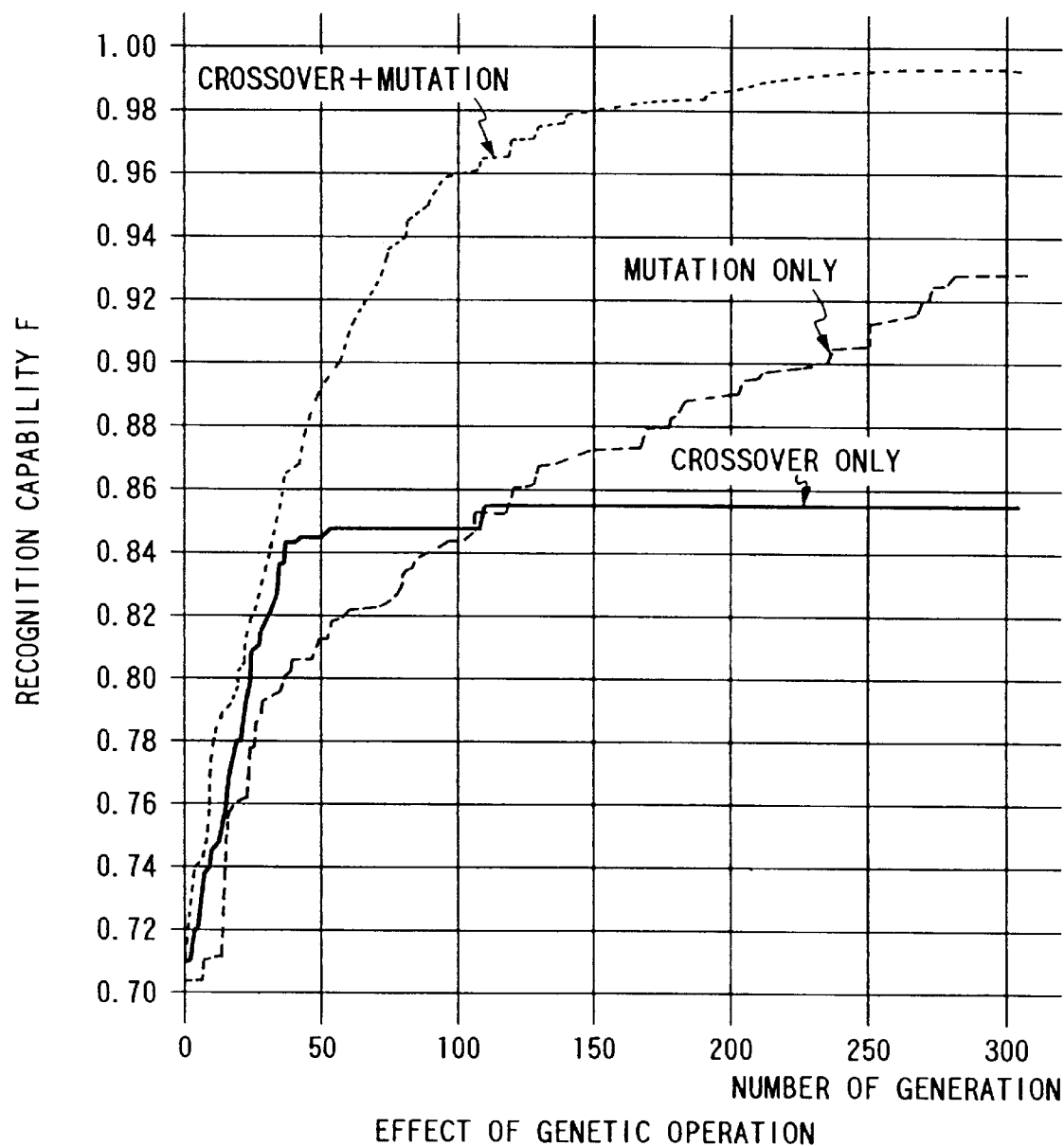
FIG. 13 is a graph showing improvement of fitness in the evolution of genetic generations.
Figure 14:
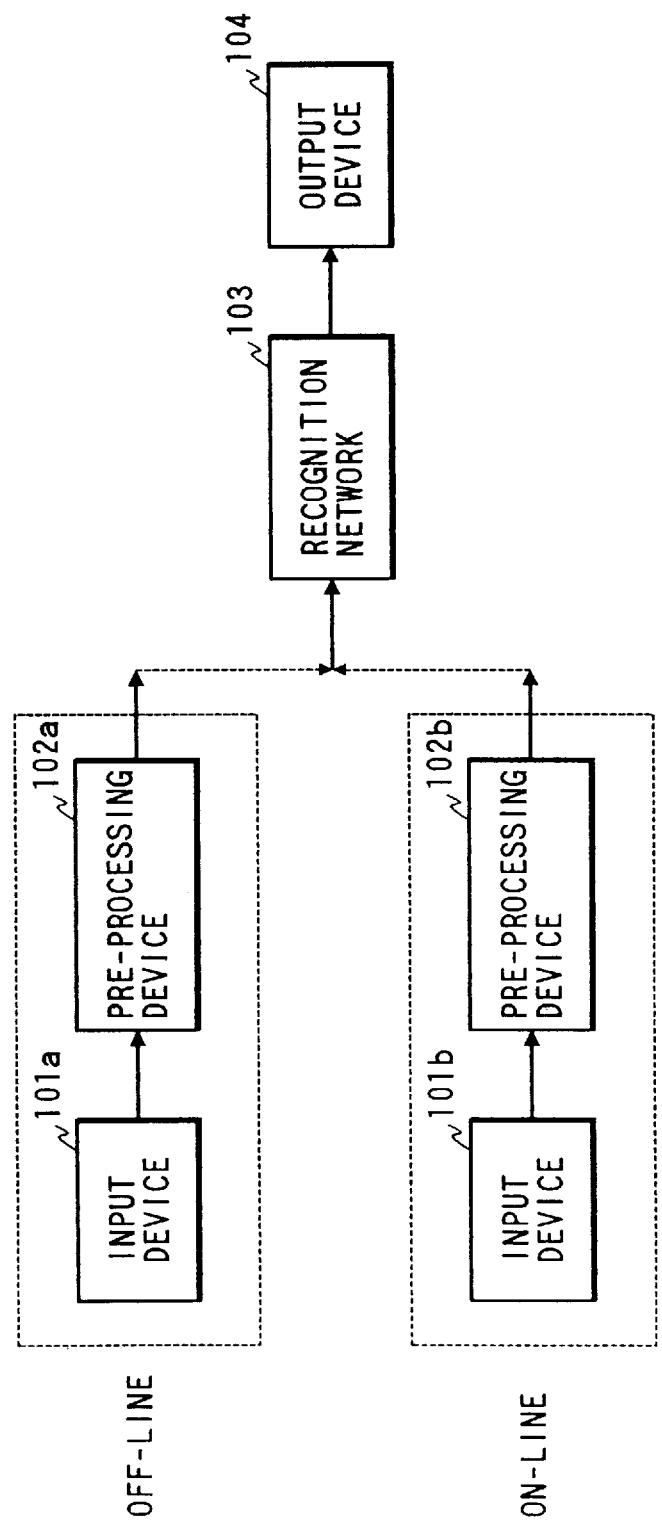
FIG. 14 is a schematic view showing a signature recognition system of a related art.

FIG. 13 is a graph showing the effect of the genetic algorithm, with the ordinate representing recognition capability F (i.e. fitness) and the abscissa representing the number of generations. As shown in FIG. 13, relying only the crossover is not effective in that the recognition capability is saturated once the chromosomes are uniformed, although the fitness is quickly improved in the earlier generations. If only the mutation is used, the fitness is gradually increased throughout all the generations, although the speed of increase is relatively slow. However, it is apparently understood that combining the crossover with the mutation best functions to quickly improve the fitness.

In summary, the present embodiment provides a signature recognition apparatus comprising:

input means (201) for inputting a handwritten signature and generating signals representing the handwritten signature;

characteristic data generating means (203) for sampling the signals generated by the input means at predetermined timings, and generating characteristic data representing a plurality of characteristic portions of the handwritten signature and having fluctuations on the basis of the data sampled;

a plurality of independent fluctuation absorbing means (301n, n=1,2---m) receiving characteristic data representing each of characteristic portions and creating fuzzified data using membership functions;

a plurality of independent switching means ($L_{si}$, $S_{si}$, $\theta_{si}$ and $C_{si}$), associated with the plurality of independent fluctuation absorbing means, each switching means passing or blocking fuzzified data in accordance with a predetermined control rule;

evaluating means (302, 303) for inputting data passing through the plurality of independent switching means and comparing the input data with an ideal value, thereby obtaining an evaluation value of the control rule presently used;

retrieval means (205) for finding an optimum control rule having a best evaluation value by repeating a predetermined operation, the predetermined operation including steps of renewing part of the presently used control rule by a given rate, making each of the plurality of independent switching means pass or block the fuzzified data in accordance with a renewed control rule, and obtaining an evaluation value of the renewed control rule by the evaluating means; and memory means (206) for memorizing resultant data obtained by the retrieval means.

As described above, the present invention divides the personal characteristics or features data of signature peculiar to each signer into a plurality of line segments. A plurality of parameter groups representing these line segments constitute loci, respectively. Genetic calculations (crossover and mutation of loci) are repeatedly executed to breed elite loci. Thus, it becomes feasible to effectively detect peculiar elements of personal characteristics of the signature of individual signers, thereby providing a signature recognition apparatus assuring higher recognition rates by utilizing such personal characteristics or features. Furthermore, the recognition network is constituted by a group of trapezoidal membership function units and a multiplication unit multiplying all of outputs from these membership function units. Hence, it becomes feasible to absorb fluctuations of signatures, increasing efficiency and accuracy of signature recognition.

Recognition Mode

Next, the recognition mode will be explained with reference to the flow chart of FIG. 3.

When the recognition mode is selected in the step 100, CPU proceeds to a step 210 wherein the user is requested to enter his/her ID code (registration code) in accordance with a request message displayed on the monitor (not shown) or the like. Then, the ID code entered in response to this request is read in. The registration code entered in this step is the same ID code as that registered in the learning mode.

In a step 220, CPU fetches chromosome data from the memory 206 with reference to the ID code entered, the chromosome data being obtainable in the learning mode and showing the optimum combination of ON-and-OFF pattern representing the state of respective switches $L_{si}$, $S_{si}$, $\theta_{si}$ and $C_{si}$ and the information $N_{pi}$ representing the number of the corresponding sequential dot data in connection with the related ID code.

In a step 230, CPU adjusts the arrangement of recognition network means 204 in accordance with the chromosome data fetched in the step 220. Namely, each of switches $L_{si}$, $S_{si}$, $\theta_{si}$ and $C_{si}$ and each of membership functions 301n (n=1,2----m) are set in a designated condition according to the fetched chromosome data.

In a step 240, the CPU requests the user to enter handwritten signature to be unknown. In response to this request, the user enters a handwritten signature through the input means 201. Thus, the input means 201 generates sequential dot data on a two-dimensional plane.

In a step 250, the sequential dot data generated from the input means 201 skip the automatic signature creating means 202 and enter into the data extracting means 203 in which four data of length Li, inclination Si, maximum angle θi and curvature Ci are extracted based on these sequential dot data in the same manner as in the learning mode.

In a step 260, the recognition network means 204 performs an evaluation of data extracted by the data extracting means 203. More specifically, the recognition network means 204 is situated in a designated arrangement so that the ON-and-OFF pattern of respective switches agrees with the loci data corresponding to the registered code. Therefore, if an input data virtually meets the data registered in the learning mode, its output is substantially equal to 1. Hence, when an output of the recognition network 204 is not less than a predetermined reference value, it is considered that the unknown signature is a positive example (i.e. genuine signature). That is, each membership function 301n generates a grade value equal to or near 1 whenever the inquired signature is genuine; therefore, the output of the recognition network 204 which is a product of all the grade levels of the membership functions 301n (n=1,2,---m) becomes virtually 1 when the signature is genuine.

Figure 12:
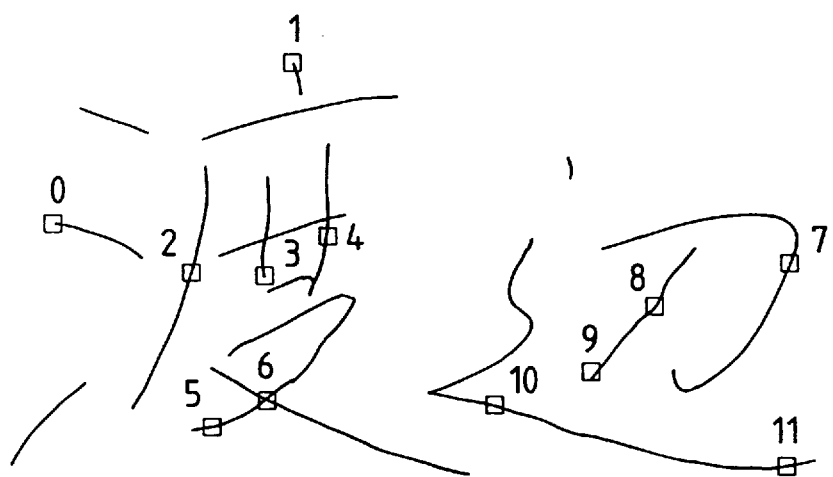
FIG. 12 is a view showing another example (negative example) of signature data having chromosomes determined.

On the contrary, when the unknown signature is false, the output of the recognition network 204 becomes a small value compared with 1. Because, each membership function 301n generates a grade value smaller than 1; therefore, a product of all the grade levels of the membership functions 301n (n=1,2,---m) becomes a fairly small value compared with 1. Thus, it is considered that the inquired signature is a negative example (i.e. false signature) when the output of the recognition network means 204 is in a predetermined range of small values. In this embodiment, an output value not larger than 0.5 is considered as negative example, while an output value in a range of 0.5 and 0.7 is considered as undiscriminatable. FIG. 12 shows a negative example in contrast with the signature shown in FIG. 11. As understood from the comparison between two signatures, the line segments designated by the same chromosome is not always identical. For example, numeral 1 indicates the line segments apparently different from each other on the two, positive and negative, signatures. Thus, it is accurately and surely concluded that the inquired signature is false in the case of the negative example of FIG. 12.

In a step 270, the output means 207 produces the result on the basis of evaluation and judgement in the recognition network means 204. The resultant data can be, for example, displayed on the monitor, by indicating an alternative judgement between genuine and false or a probability (i.e. percentage) of genuine signature. After that, the procedure of the recognition mode is completed.

As apparent from the foregoing description, the present invention provides a recognition means for judging whether an inquired signature is genuine or false on the basis of the optimum control rule registered in the learning mode (i.e. found by the retrieval means).

The arrangement of a signature recognition system in accordance with the present invention is not limited to any particular type, although the present embodiment adopts an arrangement based on an on-line recognition system using the input means 201 such as tablet or digitizer. For example, a scanner or the like can be adopted as an input device for realizing an off-line signature recognition system. Furthermore, personal characteristics or features can be represented by spectrum intensity, stroke density or the like instead of line segment.

Furthermore, the membership function 301n needs not be limited to a trapezoidal type, and therefore can be any other type if it has a capability of absorbing fluctuations of input.

Yet further, the present embodiment discloses the recognition network means 204 which evaluates four kinds of data ($L_{si}$, $S_{si}$, $\theta_{si}$, $C_{si}$) representing a line segment. However, it is also possible for the recognition network means 204 to evaluate other parameters such as the start point ($P_{sti}$) and the sequential-dot-data number $N_{pi}$ used for the setting of line segment. In this case, there will be added an appropriate number of exclusive membership functions and switches dedicated to the newly added parameters.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A signature recognition apparatus comprising:

input means for inputting a genuine signature and an unknown signature and generating signals representing said genuine and said unknown signatures;

a characteristic data generating means for sampling said signals generated by said input means and generating a plurality of characteristic data each representing a a characteristic portion of said genuine and said unknown signatures, each characteristic data having fluctuations obtained on the basis of said signals sampled;

a plurality of independent fluctuation absorbing means each receiving one of said plurality of characteristic data and creating fuzzified data, each of said fuzzified data corresponding to one of said plurality of characteristic data of said genuine and said unknown signatures using membership functions;

a plurality of independent switching means, each associated with one of said plurality of independent fluctuation absorbing means, each of said plurality of independent switching means passing or blocking each of said fuzzified data in accordance with a given ON-and-OFF pattern representing one of an on and an off condition of each of said plurality of switching means;

evaluating means for comparing said fuzzified data corresponding to said genuine signature passing through said plurality of independent switching means with an ideal value, thereby obtaining an evaluation value of a combination of ON-and-OFF patterns presently used to control said plurality of switching means;

retrieval means for finding an optimum combination of ON-and-OFF patterns having a best evaluation value by repeating a predetermined operation, said predetermined operation comprising the steps of setting a plurality of combinations of ON-and-OFF patterns, deleting some of said plurality of combinations of ON-and-OFF patterns having lower evaluation values, selecting other of said plurality of combinations of ON-and-OFF patterns having higher evaluation values, creating new combinations of ON-and-OFF patterns by combining said selected other of said plurality of combinations using a genetic algorithm, and replacing said deleted combinations with said newly created combinations of ON-and-OFF patterns; and recognition means for judging whether said unknown signature is genuine on the basis of said fuzzified data corresponding to said unknown signature and passing through said plurality of independent switching means controlled by said optimum combination of ON-and-OFF patterns found by said retrieval means.

2. The signature recognition apparatus defined by claim 1, wherein said ON-and-OFF pattern is represented by information comprising a plurality of binary-encoded data, and said retrieval means reverses some of said binary-encoded data at a given rate.

3. The signature recognition apparatus defined by claim 1, wherein said evaluating means comprises a multiplication unit for multiplying data passing through said plurality of independent switching means; and an evaluation function for calculating said evaluation value on the basis of a resultant data generated from said multiplication unit and said ideal value.

4. The signature recognition apparatus defined by claim 1, wherein said independent fluctuation absorbing means is constituted by a trapezoidal membership function unit.

5. The signature recognition apparatus defined by claim 1, wherein said input means generates sequential dot data representing said genuine and unknown signatures.

6. The signature recognition apparatus defined by claim 1, further comprises automatic signature creating means interposed between said input means and said characteristic data generating means.

7. The signature recognition apparatus defined by claim 6, wherein said automatic signature creating means includes a random number generating means for generating random numbers, a filter means for limiting a width of a fluctuation generated from said random number generating means, and a multiplication means for multiplying sequential dot data supplied from said input means and random numbers generated from said filter means.

8. The signature recognition apparatus defined by claim 1, wherein said characteristic data generated by said characteristic data generating means comprises information relating to at least one of length, inclination and curvature of each line segment at a plurality of portions on a signal representing one signature.

9. The signature recognition apparatus defined by claim 8, wherein said number of said plurality of portions on said signal is not smaller than 10.

10. A signature characteristics learning apparatus comprising:

input means for inputting a genuine signature and generating signals representing said genuine signature;

characteristic data generating means for sampling said signals generated by said input means, and generating a plurality of characteristic data each representing a characteristic portion of said genuine signature, said each characteristic data having fluctuations obtained on the basis of said signals sampled;

a plurality of independent fluctuation absorbing means each receiving one of said plurality of characteristic data and creating fuzzified data, each of said fuzzified data corresponding to one of said plurality of characteristic data of said genuine signature using membership functions;

a plurality of independent switching means, each associated with one of said independent fluctuation absorbing means, each of said plurality of independent switching means passing or blocking said each of said fuzzified data in accordance with a given ON-and-OFF pattern representing one of an on and an off condition of each of said plurality of switching means;

evaluating means for comparing said fuzzified data passing through said plurality of independent switching means with an ideal value to obtain an evaluation value of a combination of ON-and-OFF patterns presently used to control said plurality of switching means;

retrieval means for finding an optimum combination of ON-and-OFF patterns having a best evaluation value by repeating a predetermined operation, said predetermined operation comprising the steps of setting a plurality of combinations of ON-and-OFF patterns, deleting some of said plurality of combinations of ON-and-OFF patterns having lower evaluation values, selecting other of said plurality of combinations of ON-and-OFF patterns having higher evaluation values, creating new combinations of ON-and-OFF patterns by combining said selected other of said plurality of combinations using a genetic algorithm, and replacing said deleted some combinations with said newly created combinations of ON-and-OFF patterns; and memory means for storing said optimum combination of ON-and-OFF patterns obtained by said retrieval means.

11. The signature recognition apparatus defined by claim 10, wherein said combination of ON-and-OFF patterns is represented by information comprising a plurality of binary-encoded data, and said retrieval means reverses some of said binary-encoded data at a given rate.

12. The signature characteristics learning apparatus defined by claim 10, wherein said evaluating means comprises a multiplication unit for multiplying data passing through said plurality of independent switching means; and an evaluation function for calculating said evaluation value on the basis of a resultant data generated from said multiplication unit and said ideal value.

13. The signature recognition apparatus defined by claim 10, wherein said input means generates sequential dot data representing said signature.

14. The signature characteristics learning apparatus defined by claim 10, wherein said independent fluctuation absorbing means is constituted by a trapezoidal membership function unit.

15. The signature characteristics learning apparatus defined by claim 10, further comprises automatic signature creating means interposed between said input means and said characteristic data generating means.

16. The signature characteristics learning apparatus defined by claim 15, wherein said automatic signature creating means includes a random number generating means for generating random numbers, a filter means for limiting the width of a fluctuation generated from said random number generating means, and a multiplication means for multiplying sequential dot data supplied from said input means and random numbers generated from said filter means.

17. A signature characteristics learning method comprising the steps of:

inputting a genuine signature;

transforming said genuine signature into sequential dot data;

generating a plurality of characteristic data each representing a characteristic portion of said genuine signature having fluctuations obtained on the basis of said sequential dot data;

creating fuzzified data each corresponding to said one of said plurality of characteristic data of said genuine signature through a plurality of independent membership functions;

passing or blocking said fuzzified data created by said plurality of membership functions in accordance with a given ON-and-OFF pattern representing one of a validation and a nullification of each of said independent membership functions;

comparing passed fuzzified data corresponding to said genuine signature with an ideal value for obtaining an evaluation value of a combination of ON-and-OFF patterns presently used; and finding an optimum combination of ON-and-OFF patterns having a best evaluation value by repeating a series of operations, said operations comprising the steps of setting a plurality of combinations of ON-and-OFF patterns, deleting some of said plurality of combinations of ON-and-OFF patterns having lower evaluation values, selecting other of said plurality of combinations of ON-and-OFF patterns having higher evaluation values, creating new combinations of ON-and-OFF patterns by combining said selected other of said plurality of combinations while using a genetic algorithm, and replacing said deleted some of combinations with said newly created combinations of ON-and-OFF patterns, thereby obtaining personal characteristic data peculiar to each signer.

18. The signature recognition apparatus defined by claim 17, wherein said optimum combination of ON-and-OFF patterns is stored in connection with an identification number of the signer.

19. The signature characteristics learning method defined by claim 17, wherein said characteristic data includes a plurality of parameters representing a line segment on said handwritten signature.

20. The signature characteristics learning method defined by claim 17, wherein each output of said independent membership function is selectively passed or blocked by a switching means.

21. The signature characteristics learning method defined by claim 20, wherein said control rule defines an ON-and-OFF pattern of plurality of switch means associated with said independent membership functions.

22. The signature recognition apparatus defined by claim 17, wherein some combination of ON-and-OFF patterns having a low fitness are deleted according to a genetic algorithm.

23. The signature recognition apparatus defined by claim 22, wherein said deleted combination of ON-and-OFF patterns are replaced by newly created combination of ON-and-OFF patterns.

24. The signature recognition apparatus defined by claim 23, wherein said newly created combination of ON-and-OFF patterns are produced by crossing a plurality of combination of ON-and-OFF patterns having high fitnesses.

25. A signature characteristics recognizing method comprising the steps of:

requesting a user to enter an identification number;

inputting an unknown signature;

fetching a predetermined combination of ON-and-OFF patterns peculiar to a genuine signature corresponding to said unknown signature from a memory in accordance with said identification number entered;

extracting characteristic data representing a plurality of characteristic portions of said unknown signature;

receiving said characteristic data corresponding to said unknown signature and creating fuzzified data using membership functions;

passing or blocking said fuzzified data by a plurality of independent switching means in accordance with said fetched predetermined combination of ON-and-OFF patterns representing one of an on and an off condition of each of said plurality of independent switching means; and judging whether said unknown signature is genuine or false based on said fuzzified data passing through said plurality of independent switching means controlled by said fetched predetermined combination of ON-and-OFF patterns.

* * * * *